United States Patent [19]
Kurkjian, Jr.

[11] 3,823,913
[45] July 16, 1974

[54] VALVE FOR INSTALLATION IN FLUME

[75] Inventor: Gregory A. Kurkjian, Jr., Wheaton, Ill.

[73] Assignee: Henry Pratt Company, Aurora, Ill.

[22] Filed: June 7, 1973

[21] Appl. No.: 367,778

[52] U.S. Cl. ............................. 251/305, 251/143
[51] Int. Cl. ............................................ F16k 1/22
[58] Field of Search .............. 61/12, 14, 15, 16, 22, 61/25; 251/143, 305

[56] References Cited
UNITED STATES PATENTS
2,584,364  2/1952  Osborn ............................. 61/25

Primary Examiner—Harold W. Weakley
Attorney, Agent, or Firm—Hofgren, Wegner, Allen, Stellman & McCord

[57] ABSTRACT

A butterfly valve for installation in a flume or the like. The valve includes a body having a shape substantially corresponding to the cross section of the flume in which the valve is to be installed, the valve body being slightly larger in size about a majority of its periphery than the cross section of the flume so as to be receivable in a preformed recess in the wall of the flume. The valve body includes a fluid passage and a valve disc journalled therein for movement between open and closed positions. The valve body is easily mounted in the groove formed in the wall of the flume by the provision of a plurality of threaded elements threadably received at spaced locations in the valve body about the majority of the periphery of the valve body and which may be extended to tightly embrace one side wall of the groove in the flume to force the opposite side of the valve body tightly against the opposite wall of the groove in the flume.

12 Claims, 4 Drawing Figures

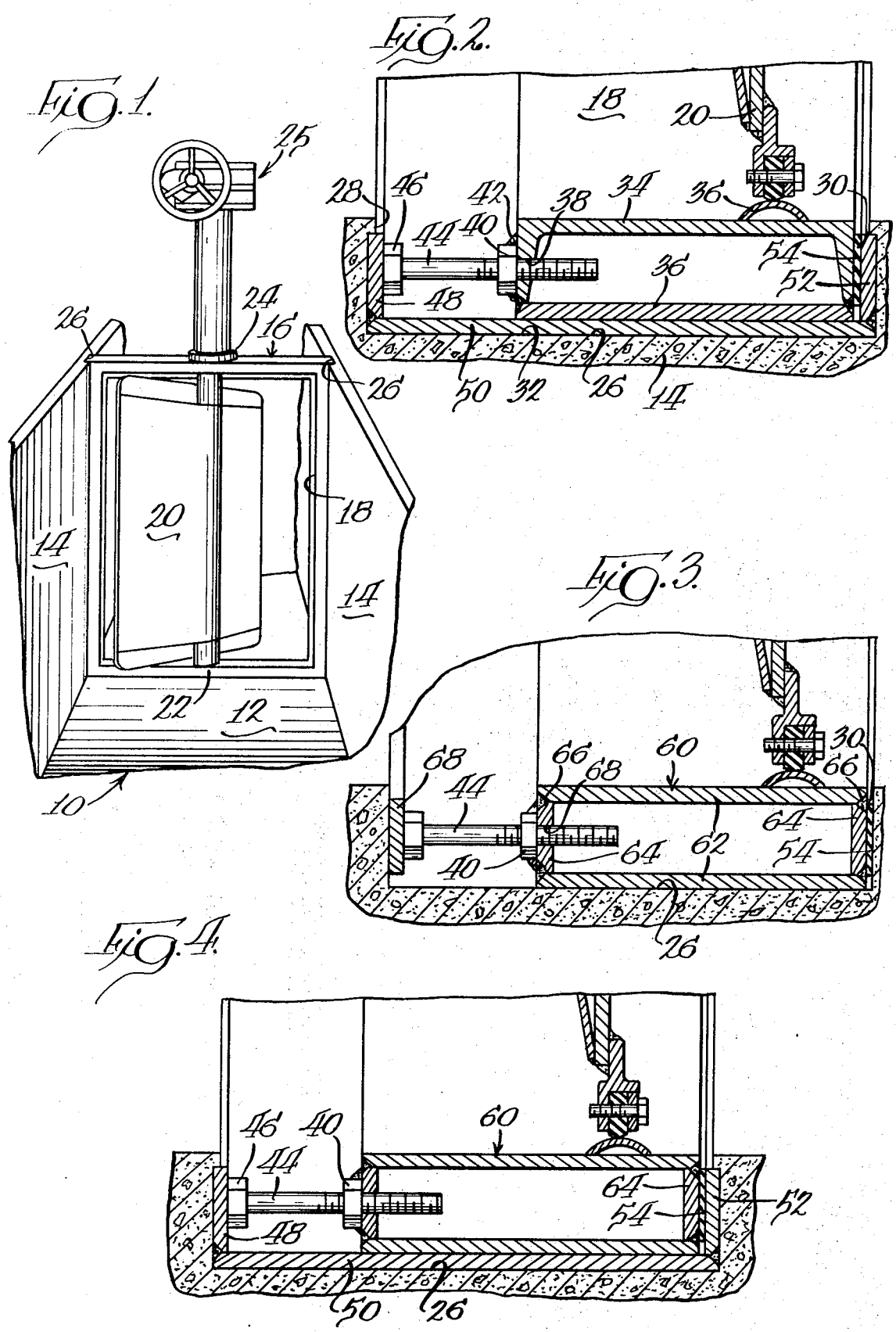

VALVE FOR INSTALLATION IN FLUME

BACKGROUND OF THE INVENTION

This invention relates to valves for installation in flumes or channels or the like, and more particularly, to a butterfly valve for such installation having improved mounting means to facilitate easy installation.

Control of the flow of fluid in channels or flumes or the like has been achieved through the use of valves installed in the flumes. However, because the flumes or channels are typically formed of concrete or the like, installation of fluid flow regulating valves has frequently been exceedingly difficult. Oftentimes, the valve has been cast in place when the flume is formed of concrete. This practice is time-consuming and expensive by reason of the necessity of having to exercise great care during the casting process to preclude damage to the valve. In addition, it is frequently necessary to delay the construction of a flume to await arrival of a valve designed therefor before the flume may be cast. Such waiting decreases the efficiency of the construction process and therefore increases the cost thereof.

Where it has been attempted to install the valve after the flume has been constructed, other difficulties present themselves. For example, it may be necessary during the flume construction process to set up relatively elaborate forms to provide means whereby the valve may be subsequently secured to the walls of the flume. This process is, of course, time-consuming and expensive.

SUMMARY OF THE INVENTION

It is the principal object of the invention to provide a new and improved valve for installation in a flume. More specifically, it is an object of the invention to provide such a valve that may be easily installed in a flume after the flume has been constructed and without the need for the use of elaborate forms during the construction of the flume.

An exemplary embodiment of the invention achieves the foregoing objects through a construction including a valve body which is designed to be easily installed in a preformed groove in the wall of a flume or the like. The valve body has a shape corresponding to the cross section of the flume in which it is to be installed and is slightly larger in size about a majority of its periphery, the size corresponding to the size of that of the groove in a flume wall.

In the preferred embodiment, the valve is a butterfly valve and, accordingly, the body has a fluid passage extending therethrough. A valve disc is journalled in the valve body for rotative movement between open and closed positions.

For mounting purposes, the valve body mounts, about the majority of its periphery, at spaced locations, a plurality of extendable elements which may be extended in a direction parallel to that of the fluid passage to tightly embrace one side of the groove in the flume wall to forcibly urge the opposite side of the valve body into firm engagement with the opposite side of the groove in the flume wall.

According to the preferred embodiment, the extendable elements are threaded bolds received in nuts secured to the valve body.

In one embodiment, the valve body is formed of a conventional C-shaped channel, while in another, the valve body is formed of a box beam.

Preferably, a strike plate is employed in connection with both embodiments. The strike plate has a size and shape corresponding to the side wall of the groove of the flume so that the same may be located in the groove and have the head of the bolts abut thereagainst. In a preferred embodiment, the strike plate is defined by one leg of a C-shaped structure which is received in the groovee in the flume to open outwardly into the flume.

Preferably, a sealing gasket is provided to be interposed between the side of the valve body opposite the extendable elements and the corresponding side wall of the groove formed in the flume wall.

Other objects and advantages will become apparent from the following specification taken in conjunction with the accompanying drawings.

DESCRIPTION OF THE DRAWINGS

FIG. 1 is a perspective view of a valve made according to the invention installed in a flume;

FIG. 2 is a sectional view of one form of a valve made according to the invention installed in a flume;

FIG. 3 is a view similar to FIG. 2 illustrating a modified embodiment of the valve; and FIG. 4 is a view similar to FIGS. 2 and 3 showing still another modified embodiment of the invention.

DESCRIPTION OF THE PREFERRED EMBODIMENTS

With reference to FIG. 1, a flume, generally designated 10, is seen to include a bottom wall 12 and opposed side walls 14. Within the flume 10 is a valve made according to the invention and the same includes a valve body, generally designated 16, having a fluid passage 18 extending therethrough. Located within the fluid passage 18 is a valve disc 20 which is journalled as at 22 and 24 on opposite sides of the valve body 16 for rotation within the valve body 18 between open and closed positions. Extending upwardly from the valve body 16 is a valve disc operating mechanism, generally designated 25, which may be of conventional construction.

According to the invention, the flume 10 will normally be formed of a pourable, settable material such as concrete and the same is cast in forms in the usual manner. Internaklly, each of the walls 12 and 14 are provided with a groove 26 for receipt of at least a portion of the valve body 16.

With reference now to FIG. 2, the groove 26 is seen to include opposed side walls 28 and 30 respectively and a bottom wall 32. According to the embodiment of the invention illustrated in FIG. 2, the valve body 16 may be formed in a rectangular configuration through the use of a C-shaped channel beam 34 to have a shape conforming to the cross sectional shape of the flume 10 as seen in FIG. 1 and, as seen in FIG. 2, to have a size corresponding approximately to that of the groove 26. For strengthening purposes, a plate 36 may be secured across the legs of the channel 34 so as to preclude the legs from being deformed inwardly during the installation of the valve.

The disc 20, by any suitable construction, may carry a peripheral seal 36 which may sealingly engage the base of the channel 34 defining the valve body 16 when the disc 20 is in the closed position.

One of the legs of the channel 34 defining the valve body 16 includes a plurality of apertures 38 (only one of which is shown) which, in turn, are aligned with nuts 40 (only one of which is shown) secured as by welds 42 to the exterior of the leg. Received within the nuts 40 are bolts 44 (again, only one of which is shown) having heads 46 which define extendable elements which are movable relative to the valve body 16 in a direction parallel to the fluid opening 18 therein. Since, in the ordinary flume, there will not be a top wall, it is only necessary to provide the extendable elements in the form of the bolts 44 about a majority of the periphery of the valve body 16. That is, they need only be provided about that portion of the valve body periphery which will be received in the groove 26 formed in the flume.

The side wall 28 of the groove 26 in the flume 14 adjacent the head 46 of the bolts 44 is provided with a strike plate 48. As illustrated in FIG. 2, the strike plate 48 constitutes one leg of a C-shaped member 50 which is sized to be relatively snugly received in the groove and preferably is cast therein.

An opposite leg 52 of the C-shaped member 50 is located at the opposite side 30 of the groove 26 in the flume 14 and interposed between the same and the leg of the channel 34 oppositely from the nuts 40 is a rubber sealing gasket 54.

The flume 10 may be precast with the groove 26 located therein and with the C-shaped member 50 preformed therein according to predetermined dimensions corresponding to the dimensions of the valve body 16 and the extendable elements 44 when extended. When the valve is to be installed, the bolts 44 are threaded into the channel 34 sufficiently to allow the valve body 16 to be easily located in the groove 26 and the rubber gasket 54 located in place. At this time, through conventional means, the bolts 44 may be rotated to extend themselves from the valve body 16 to bear tightly against the strike plate 48 whereupon the valve body 16 will be firmly wedged in place in the flume with the sealing gasket 54 providing a seal about the exterior of the valve body 16.

FIG. 3 illustrates a modified embodiment of the invention. According to the embodiment illustrated in FIG. 3, the valve body is formed of a box beam 60. The box beam 60 may be fabricated by parallel paris of plates 62 coupled together by parallel plates 64. The plates 62 and 64 may be held in assembled relation by any suitable means such as welds 66. In the embodiment illustrated in FIG. 3, an aperture 68 corresponding approximately to the aperture 38, is located in one of the plates 64 and the nuts 40 welded thereon. The bolts 44 are located on the valve body in the same manner as in the case of the embodiment illustrated in FIG. 2. However, in lieu of the strike plate 48 forming part of the C-shaped member 50, a single strike plate 68 may be employed. In the case of the embodiment illustrated in FIG. 3, the sealing gasket 54 is interposed between the plate 64 opposite that mounting the nuts 40 and the side wall 30 of the groove 26 formed in the flume. Operation and installation is generally the same as mentioned in connection with the embodiment of FIG. 2.

FIG. 4 illustrates still another embodiment of the invention wherein a valve having a body formed of a box beam 60 as described above in connection to the embodiment illustrated in FIG. 3, is employed in a groove 26 in the flume pre-fitted with a C-shaped member 50 as described in connection with the embodiment illustrated in FIG. 2 such that the heads 46 of bolts 44 engage a strike plate 48 forming one of the legs of the C-shaped member 50. In the case of the embodiment illustrated in FIG. 4, the gasket 54 is located between a leg 52 of the C-shaped member 50 and the plate 54 opposite that mounting the nuts 40.

From the foregoing, it will be appreciated that a valve made according to the invention is easily and rapidly installed in a flume. The unique mounting means including the extendable elements in the form of the bolts 44 preclude the need for elaborate forms heretofore required and allow the flume to be built well in advance of installation of the valve so that the valve need not be cast into the flume as the flume itself is formed. Through the use of the invention, it is only necessary for the user of the valve to ascertain from the manufacturer, the dimensions in which the value is available and appropriately construct the flume with the preformed groove 26 therein. Alternately, the constructor of the flume may provide the valve manufacturer with the dimensions of the flume to be constructed and proceed with flume construction while the valve manufacturer is constructing an appropriately dimensioned valve. In all cases, construction efficiency is maximized thereby minimizing construction and valve installation cost.

Finally, it will be recognized that the invention is not limited to butterfly valves. For example, other valves, such as sluice gates, having outer valve bodies movably mounting a valve member, can readily employ the invention with the attendant improved results.

I claim:

1. A butterfly valve for installation in a flume or the like, the combination comprising: a valve body having a shape substantially corresponding to the cross section of the flume in which the valve is to be installed, said valve body being slightly larger in size about a majority of its periphery than the cross section of the flume in which it is to be installed so as to be receivable in a recess formed in the wall of the flume; a fluid passage extending through said valve body; a valve disc in said fluid passage and journalled for rotation in said valve body for movement between a first position closing said passage and a second position opening said passage; and means for mounting said valve body in a groove in a flume including a plurality of extendable elements movably mounted at spaced locations in said valve body and about said majority of the periphery of said valve body and movable therein in a direction substantially parallel to said fluid opening, said extendable elements being movable into tight abutment with one side of a groove in a flume wall to force an opposite side of the valve body into tight engagement with the opposite side of a groove in the flume.

2. A butterfly valve according to claim 1 wherein said extendable elements comprise threaded elements threadedly received in said valve body.

3. A butterfly valve according to claim 1 wherein said extendable elements comprise bolts threadably received in nuts secured to said valve body.

4. A butterfly valve according to claim 3 wherein said valve body is defined by an outwardly opening C-shaped channel.

5. A butterfly valve according to claim 3 wherein said valve body is defined by a box beam.

6. A butterfly valve according to claim 3 further including a metal strike plate positionable within the groove in a flume in abutment with said one side thereof, said strike plate being adapted to be firmly engaged by the heads of said bolts comprising said extendable elements.

7. A butterfly valve according to claim 6 wherein said strike plate comprises one leg of a generally C-shaped structure adapted to be received in the groove of a flume.

8. A butterfly valve according to claim 1 further including a resilient member having a size and shape conforming substantially to that of said major portion of said valve disc, said sealing member adapted to be received in a groove of the flume in abutment with said other side thereof to be compressed thereagainst by said valve body when said extendable elements have been extended.

9. A butterfly valve according to claim 8 further including a metallic strike plate having a size and shape corresponding to that of the groove in a flume in which said valve is to be installed, said strike plate being adapted to be firmly engaged by said extendable elements when said extendable elements are extended in the groove of a flume.

10. A valve for installation in a flume or the like, the combination comprising: a valve body having a shape substantially corresponding to the cross section of the flume in which the valve is to be installed, said valve body being slightly larger in size about a majority of its periphery than the cross section of the flume in which it is to be installed so as to be receivable in a recess formed in the flume; a fluid passage extending through said valve body; a valve member in said fluid passage and mounted for movement in said valve body for movement between a first position closing said passage and a second position opening said passage; and means for mounting said valve body in a groove in a flume including a plurality of extendable elements movably mounted at spaced locations about the majority of the periphery of said valve body and movable therein in a direction substantially parallel to said fluid opening, said extendable elements being movable into tight abutment with one side of a groove in a flume to force an opposite side of the valve body into tight engagement with the opposite side of a groove in the flume.

11. A valve according to claim 10 wherein said extendable elements comprise bolts threadably received in nuts secured to said valve body.

12. A valve according to claim 11 further including a metal strike plate positionable within the groove in a flume in abutment with said one side thereof, said strike plate being adapted to be firmly engaged by the heads of said bolts comprising said extendable elements.

* * * * *